US012128902B2

(12) United States Patent
Hayakawa

(10) Patent No.: US 12,128,902 B2
(45) Date of Patent: Oct. 29, 2024

(54) DRIVING MODE SWITCHING CONTROL METHOD AND DRIVING MODE SWITCHING CONTROL DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/033,832

(22) PCT Filed: Oct. 29, 2020

(86) PCT No.: PCT/JP2020/040681
§ 371 (c)(1),
(2) Date: Sep. 12, 2023

(87) PCT Pub. No.: WO2022/091308
PCT Pub. Date: May 5, 2022

(65) Prior Publication Data
US 2024/0270254 A1 Aug. 15, 2024

(51) Int. Cl.
*B60W 30/182* (2020.01)
*B60W 40/08* (2012.01)
(Continued)

(52) U.S. Cl.
CPC .......... *B60W 30/182* (2013.01); *B60W 40/08* (2013.01); *B60W 50/082* (2013.01);
(Continued)

(58) Field of Classification Search
None
See application file for complete search history.

(56) References Cited

U.S. PATENT DOCUMENTS

| 8,352,110 B1* | 1/2013 | Szybalski | ............... G01S 19/10 |
| | | | 701/41 |
| 2014/0156134 A1* | 6/2014 | Cullinane | ............ G05D 1/0212 |
| | | | 701/23 |

(Continued)

FOREIGN PATENT DOCUMENTS

| CN | 110691956 A | 1/2020 |
| CN | 110834637 A | 2/2020 |

(Continued)

*Primary Examiner* — Justin S Lee
*Assistant Examiner* — Andrew Sang Kim
(74) *Attorney, Agent, or Firm* — Young Basile Hanlon & MacFarlane, P.C.

(57) ABSTRACT

A driving control device includes a processor that controls driving of a subject vehicle using any one of a first driving mode and a second driving mode having a lower driving assistance level than that of the first driving mode. The processor is configured to: after the driving mode switches from the first driving mode to the second driving mode, determine whether or not a travel environment of the subject vehicle satisfies an automatic return-possible condition; and when the travel environment of the subject vehicle satisfies the automatic return-possible condition after the driving mode switches from the first driving mode to the second driving mode, output, to a user interface, first information indicating that the driving mode of the subject vehicle can be switched automatically from the second driving mode to the first driving mode.

8 Claims, 4 Drawing Sheets

(51) Int. Cl.
  *B60W 50/08*  (2020.01)
  *B60W 50/14*  (2020.01)
  *B60W 60/00*  (2020.01)

(52) U.S. Cl.
  CPC ........ *B60W 50/14* (2013.01); *B60W 60/0053* (2020.02); *B60W 60/0057* (2020.02); *B60W 60/0059* (2020.02); *B60W 2040/0818* (2013.01); *B60W 2050/143* (2013.01); *B60W 2050/146* (2013.01); *B60W 2540/229* (2020.02); *B60W 2552/53* (2020.02); *B60W 2554/406* (2020.02); *B60W 2556/40* (2020.02)

(56) References Cited

U.S. PATENT DOCUMENTS

| | | | |
|---|---|---|---|
| 2015/0253778 A1* | 9/2015 | Rothoff | B60W 60/0057 701/25 |
| 2016/0103449 A1* | 4/2016 | Desnoyer | B60W 10/04 701/23 |
| 2017/0371334 A1* | 12/2017 | Nagy | B60W 50/14 |
| 2018/0319402 A1 | 11/2018 | Mills et al. | |
| 2019/0241196 A1 | 8/2019 | Yamamoto et al. | |
| 2020/0158531 A1 | 5/2020 | Takeuchi et al. | |
| 2020/0231158 A1 | 7/2020 | Okuyama et al. | |

FOREIGN PATENT DOCUMENTS

| | | |
|---|---|---|
| JP | 2015-182624 A | 10/2015 |
| JP | 2017-019424 A | 1/2017 |
| JP | 2019-138669 A | 8/2019 |
| JP | 2019-168840 A | 10/2019 |
| JP | 2020-067858 A | 4/2020 |
| WO | 2019/064350 A1 | 4/2019 |

* cited by examiner

DRIVING MODE SWITCHING CONTROL METHOD AND DRIVING MODE SWITCHING CONTROL DEVICE

TECHNICAL FIELD

The present invention relates to a driving control method for presenting travel information of a subject vehicle and relates also to a driving control device.

BACKGROUND

JP2015-182624A describes a driving control device that changes the image of a human hand displayed on a monitor in accordance with a driving assistance level so that the driver of the subject vehicle can easily recognize the driving assistance level of automated or autonomous driving.

SUMMARY

The driving control device of JP2015-182624A, however, has a problem in that it does not present whether or not the driving assistance level will automatically rise again after the driving assistance level has once lowered, that is, whether or not the driving assistance level can be automatically returned.

A problem to be solved by the present invention is to provide a driving control method and a driving control device that are able to present whether or not the driving mode can automatically return when the driving mode switches to a mode having a low driving assistance level.

The present invention solves the above problem by, when a travel environment of the subject vehicle satisfies an automatic return-possible condition after the driving mode switches to a driving mode having a lower driving assistance level, outputting, to a user interface, first information indicative of automatically switching the driving mode of the subject vehicle can be switched automatically from a second driving mode to a first driving mode.

According to the present invention, an effect is obtained that when the driving mode switches to a driving mode having a lower driving assistance level, it is possible to present whether or not the driving mode can be returned automatically in accordance with the driving situation of the subject vehicle.

DETAILED DESCRIPTION

Hereinafter, embodiments of the present invention will be described with reference to the drawings.

First Embodiment

The first embodiment will be described with reference to FIGS. 1 and 2.

Figure 1:
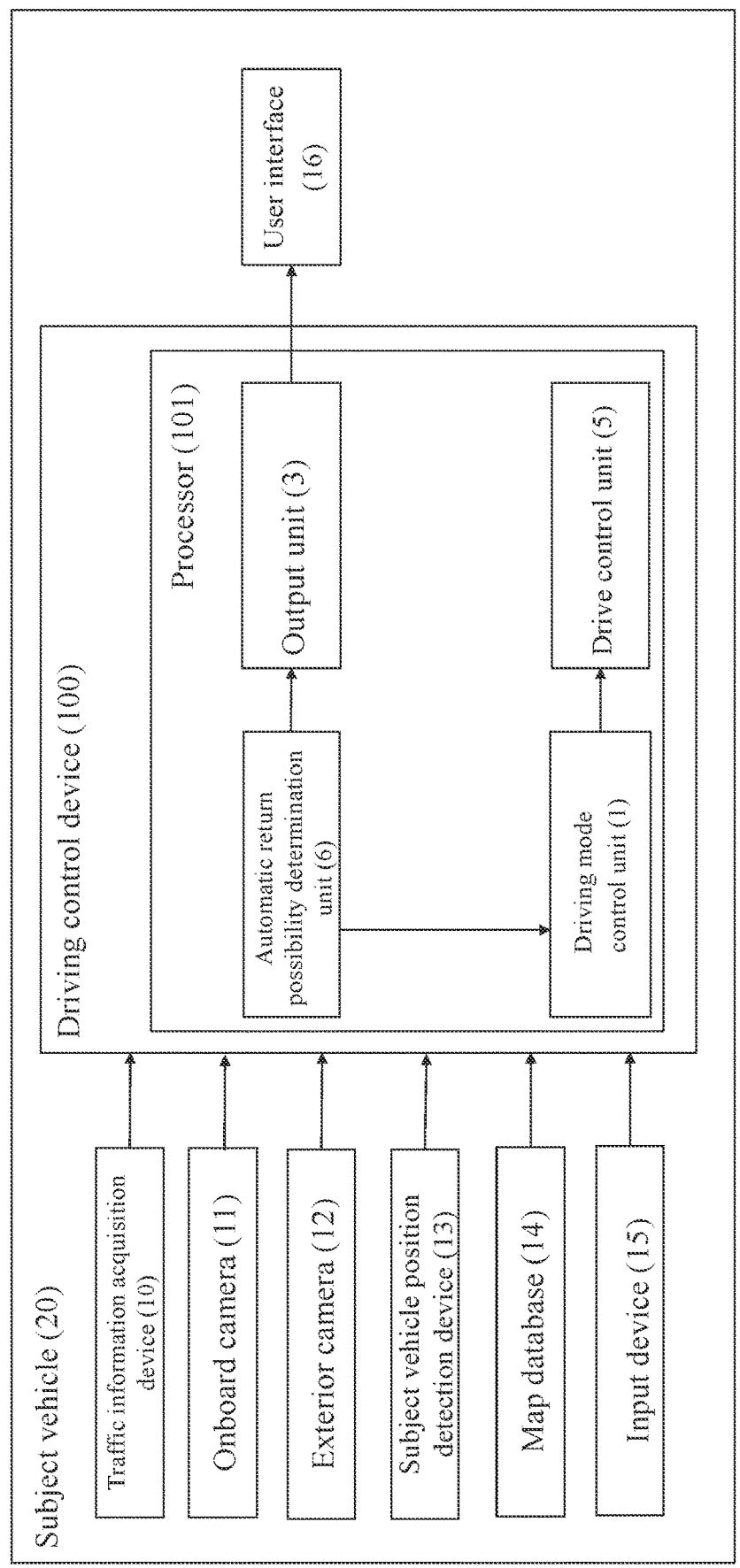
FIG. 1 is a block diagram illustrating the configuration of a driving control device according to a first embodiment of the present invention.

FIG. 1 is a block diagram illustrating the configurations of a driving control device 100 and a subject vehicle 20 according to the present embodiment. As illustrated in FIG. 1, the subject vehicle 20 includes the driving control device 100, a traffic information acquisition device 10, an onboard camera 11, an exterior camera 12, a subject vehicle position detection device 13, a map database 14, an input device 15, and a user interface 16. These devices are connected to one another, for example, via a controller area network (CAN) or other onboard LAN or a wired network.

The driving control device 100 has a processor 101 that executes functions of the driving control device 100. The processor 101 is composed of a read only memory (ROM) that stores programs for controlling the driving of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. In addition, the processor 101 of the driving control device 100 has a driving mode control unit 1, an output unit 3, a drive control unit 5, and an automatic return possibility determination unit 6. That is, the driving mode control unit 1, the output unit 3, the drive control unit 5, and the automatic return possibility determination unit 6 execute the programs for realizing respective functions of the driving control device 100. The functions realized by the driving mode control unit 1, the output unit 3, the drive control unit 5, and the automatic return possibility determination unit 6 will be described later.

The traffic information acquisition device 10 acquires road traffic information from a vehicle information and communication system (VICS (registered trademark)) using an information transmission device (beacon) provided on the road, an FM multiplex broadcast, or the like. The road traffic information includes, for example, lane-by-lane congestion information, accident information, disabled vehicle information, construction information, speed limit information, lane restriction information, etc.

The onboard camera 11, which is provided inside the subject vehicle 20, detects the driver's facial movements, eyelid movements, body movements, etc.

The exterior camera 12 captures images of other vehicles, pedestrians, obstacles, lane compartment lines, lane marks, road surface conditions, etc. around the subject vehicle 20.

The subject vehicle position detection device 13 is composed of a GPS unit, a gyro-sensor, a vehicle speed sensor, etc. The subject vehicle position detection device 13 detects radio waves transmitted from a plurality of communication satellites using the GPS unit to periodically acquire the positional information of a target vehicle (subject vehicle 20) and detects the current position of the target vehicle based on the acquired positional information of the target vehicle, the angle variation information acquired from the gyro-sensor, and the vehicle speed acquired from the vehicle speed sensor. The positional information of the target vehicle detected by the subject vehicle position detection device 13 is output to the driving control device 100 at predetermined time intervals.

The map database 14 is a memory that stores three-dimensional high-precision map information including positional information of various facilities and specific points and that is configured to be accessible from the driving control device 100. The map database 14 stores high-precision digital map information (high-precision map, dynamic map). In this example, the stored high-precision map information is three-dimensional map information based on the road shape including height information, which is detected when traveling on an actual road using a vehicle for data acquisition. The high-precision map information includes identification information for multiple lanes of a road. The map information of the map database 14 includes three-dimensional positional information regarding curves of roads and/or lanes and their curve sizes (e.g., curvature or radius of curvature), merging points, branching points, and positions at which the number of lanes decreases. The high-precision map information also includes information regarding facilities such as service areas/parking areas.

The input device 15 includes onboard equipment that operates when operated by the driver. Examples of the input device 15 include a steering wheel, an accelerator pedal, a brake pedal, a navigation device, direction indicators, and other specific switches. The input device 15 may also be a device such as a button switch that allows manual input by the driver, a touch panel arranged on a display screen, or a microphone that allows input by the driver's voice. When the input device 15 is operated by the driver, the information is output to the driving control device 100.

The user interface 16 is, for example, a device such as a display provided in the navigation device, a display incorporated in the rearview mirror, a display incorporated in a meter unit, a head-up display projected on the windshield, or a speaker provided in an audio device. The user interface 16 may also be a lamp that can be switched between On and Off or that can switch the color of illumination. The user interface 16 presents information output by the output unit 3 of the driving control device 100 to occupants of the subject vehicle 20. The occupants of the subject vehicle 20 include a driver.

Each configuration of the driving control device 100 will then be described.

The driving mode control unit 1 of the driving control device 100 can set the driving mode in response to a driving assistance level and can assist the travel of the subject vehicle in accordance with the set driving mode. The driving assistance level refers to a level indicating the degree of intervention when the driving control device 100 assists the driving of a vehicle by using an autonomous travel control function. The higher the driving assistance level, the lower the driver's contribution to driving of the vehicle. Specifically, the driving assistance level can be set by using a definition based on SAE J3016 of the Society of Automotive Engineers (SAE) or the like. At driving assistance level 0, all the driving operations of the subject vehicle are performed manually by the driver. At driving assistance level 1, the driving operations of the subject vehicle are mainly manual driving by the driver, while the driving control device 100 appropriately assists the driver's manual driving by any of functions such as automated braking, follow-up, and lane keeping. At driving assistance level 2, the driving operations of the subject vehicle are mainly manual driving by the driver, while under specific conditions, the driving control device 100 can combine two or more functions among those such as automated braking, follow-up, and lane keeping to execute the driving assistance. At driving assistance level 3, the driving control device 100 executes all the driving tasks, while when requested by the driving control device 100, the driver has to take back control and prepare to drive manually. At driving assistance level 4, manual driving by the driver is not required, and the driving control device 100 can execute all the driving tasks under specific conditions. At driving assistance level 5, the driving control device 100 can perform all the driving tasks under all conditions.

The classification of the driving assistance level is not limited to the classification according to the definition of the Society of Automotive Engineers of America, and the driving assistance level may be defined based on ISO/TC204 of the International Organization for Standardization (ISO). The classification of the driving assistance level may also be defined by other criteria, provided that the classification is appropriately performed in accordance with the degree of intervention by the driving control device 100.

The driving modes which the driving mode control unit 1 sets include at least a first driving mode and a second driving mode that has a lower driving assistance level than that of the first driving mode. The first driving mode corresponds to the driving assistance level 3, and the second driving mode corresponds to the driving assistance level 2. The driving mode control unit 1 appropriately switches the driving mode between the first driving mode and the second driving mode thereby to control the driving of the subject vehicle. The driving assistance levels of the first driving mode and the second driving mode are not limited to the driving assistance level 3 and the driving assistance level 2, respectively, and it is sufficient that the driving assistance level of the second driving mode is set lower than the driving assistance level of the first driving mode. Therefore, the first driving mode may be a driving mode corresponding to the driving assistance level 2, and the second driving mode may be a driving mode corresponding to the driving assistance level 1. Alternatively, the first driving mode may be an automated driving mode corresponding to the driving assistance level 1 or higher, and the second driving mode may be a manual driving mode corresponding to the driving assistance level 0. Additionally or alternatively, the first driving mode may be a hands-off mode and the second driving mode may be a hands-on mode. Here, the hands-off mode refers to a mode in which the autonomous steering control function operates even when the driver takes his/her hands off the steering wheel, and the hands-on mode refers to a mode in which the autonomous steering control function does not operate when the driver does not hold the steering wheel. Whether or not the driver holds the steering wheel is detected by a touch sensor provided on the steering wheel or a steering torque sensor of the EPS. The driving mode control unit 1 can set a driving mode other than the first driving mode or the second driving mode.

The autonomous steering control function is a function for controlling the operation of the steering actuator thereby to execute the steering control of the subject vehicle and assist the driver's steering operation. This autonomous steering control function includes, for example, a lane center keeping function for controlling the steering so that the subject vehicle travels near the center of a lane, a lane keeping function for controlling the lateral position so that the subject vehicle travels in the same lane, a lane change assistance function for moving from a lane on which the subject vehicle is traveling to another lane, an overtaking assistance function for passing the side (adjacent lane) of preceding another vehicle to move ahead of the other vehicle, a route travel assistance function for autonomously changing lanes to follow a route to the destination, and other similar functions.

When the driving situation of the subject vehicle 20 traveling in the first driving mode satisfies a driving mode switching condition, the driving mode control unit 1 of the driving control device 100 switches the driving mode from the first driving mode to the second driving mode. The driving situation of the subject vehicle 20 refers, for example, to the speed of a preceding vehicle or the situation of a lane change operation (start, middle, completion). "The driving situation of the subject vehicle 20 satisfying the driving mode switching condition" means, for example, that the vehicle speed of another vehicle (preceding vehicle) traveling ahead of the subject vehicle 20 exceeds the upper limit speed of a followable speed or that the subject vehicle 20 starts the lane change operation. Additionally or alternatively, the driving mode control unit 1 of the driving control device 100 may switch the driving mode of the subject vehicle 20 from the first driving mode to the second driving mode when the driver of the subject vehicle 20 traveling in the first driving mode grips the steering wheel to operate it, that is, due to the driver's intervention operation (takeover).

When the travel environment of the subject vehicle satisfies a predetermined automatic return-possible condition after the driving mode switches from the first driving mode to the second driving mode, the driving mode control unit 1 comes to an automatic return standby state in which the driving mode can be switched and returned from the second driving mode to the first driving mode. When the driving mode is in the automatic return standby state, that is, when the travel environment of the subject vehicle satisfies the automatic return-possible condition, the driving situation of the subject vehicle satisfies a predetermined driving mode return condition, and the driving mode control unit 1 thereby automatically switches and returns the driving mode to the first driving mode. On the other hand, when the travel environment of the subject vehicle does not satisfy the automatic return-possible condition after the driving mode switches from the first driving mode to the second driving mode, the driving mode control unit 1 cannot switch and return the driving mode from the second driving mode to the first driving mode. That is, unless the travel environment of the subject vehicle satisfies the automatic return-possible condition, even when the driving situation of the subject vehicle satisfies the driving mode return condition, the driving mode control unit 1 cannot automatically switch the driving mode from the second driving mode to the first driving mode.

Here, the travel environment of the subject vehicle refers to a situation of the travel route on which the subject vehicle 20 is traveling or is expected to travel, or a situation of the driver who is driving the subject vehicle. The automatic return-possible condition is a condition regarding the travel route of the subject vehicle 20 or a condition regarding the situation of the driver of the subject vehicle 20. Here, when the automatic return-possible condition is "a condition regarding the travel route of the subject vehicle 20," "the travel environment of the subject vehicle 20 satisfying the predetermined automatic return-possible condition" means, for example, that the map database 14 has high-precision map information for the travel route of the subject vehicle 20, that the lane compartment lines and lane marks of the travel route of the subject vehicle 20 are clearly painted on the road surface, or that congestion is occurring on the travel route of the subject vehicle 20. When the automatic return-possible condition is "a condition regarding the situation of the driver of the subject vehicle 20," "the travel environment of the subject vehicle 20 satisfying the predetermined automatic return-possible condition" means, for example, that the driver of the subject vehicle 20 is concentrating on the driving with a degree of concentration equal to or higher than a predetermined degree.

"The driving situation of the subject vehicle satisfying the driving mode return condition" means, for example, that the vehicle speed of the preceding vehicle ahead of the subject vehicle 20 has become equal to or lower than the upper limit speed of the followable speed or that the subject vehicle 20 executing a lane change has completed the lane change operation.

When the driving mode switches from the first driving mode to the second driving mode due to the driver's intervention operation, the driving mode control unit 1 does not automatically switch the driving mode from the second driving mode to the first driving mode regardless of whether or not the travel environment of the subject vehicle 20 satisfies the automatic return-possible condition.

When the driving situation of the subject vehicle 20 does not satisfy the driving mode return condition, the driving mode control unit 1 of the driving control device 100 does not automatically return the driving mode from the second driving mode to the first driving mode. That is, when the driving situation of the subject vehicle 20 does not satisfy the driving mode return condition, the driving mode control unit 1 of the driving control device 100 switches and returns the driving mode from the second driving mode to the first driving mode only in a case of receiving the driver's driving mode switching request via the input device 15. The driving mode switching request is output to the driving mode control unit 1, for example, when the driver presses a switch button provided on the input device 15 for switching the driving mode.

The drive control unit 5 of the driving control device 100 controls the driving of the subject vehicle based on the driving mode which the driving mode control unit 1 sets. For example, the drive control unit 5 uses the autonomous speed control function to control the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) and the brake operation for adjusting the acceleration/deceleration and the vehicle speed. Additionally or alternatively, the drive control unit 5 uses the autonomous steering control function to control the operation of the steering actuator, thereby executing the steering control of the subject vehicle. For example, the drive control unit 5 detects the lane compartment lines and lane marks of the lane in which the vehicle is traveling, and adjusts the traveling position (lateral position) of the subject vehicle in the width direction so that the subject vehicle travels at the center in the lane in which the subject vehicle is traveling. Additionally or alternatively, the drive control unit 5 controls overtaking of a preceding vehicle traveling ahead of the subject vehicle, change of the traveling direction, and the like. Additionally or alternatively, the drive control unit 5 performs travel control to turn right or left at an intersection or the like. Any of other known methods can also be used as the travel control method executed by the drive control unit 5.

After the driving mode switches from the first driving mode to the second driving mode, the automatic return possibility determination unit 6 of the driving control device 100 determines whether or not the travel environment of the subject vehicle satisfies the automatic return-possible condition which is preliminarily defined. Specifically, when the automatic return-possible condition is that "the map database 14 has high-precision map information for the travel route of the subject vehicle 20," the automatic return possibility determination unit 6 determines, based on the information from the map database 14, whether or not the high-precision map information is included in the map information for the travel route of the subject vehicle 20. Additionally or alternatively, when the automatic return-possible condition is that "the lane compartment lines and lane marks of the travel route of the subject vehicle 20 are clearly painted on the road surface," the automatic return possibility determination unit 6 determines, based on the image or video captured by the exterior camera 12, whether or not the lane compartment lines and lane marks are clearly displayed on the road surface of the travel route located ahead of the subject vehicle 20. Additionally or alternatively, when the automatic return-possible condition is that "congestion is occurring on the travel route of the subject vehicle 20," the automatic return possibility determination unit 6 determines, based on the information from the traffic information acquisition device 10, whether or not congestion is occurring for a given section or more on the travel route of the subject vehicle 20. Additionally or alternatively, the automatic return possibility determination unit 6 can also determine, based on the information from the exterior camera 12, whether or not congestion is occurring on the travel route of the subject vehicle 20 by referring to the deceleration or movement of other vehicles around the subject vehicle 20. Additionally or alternatively, when the automatic return-possible condition is that "the driver of the subject vehicle 20 is concentrating on the driving with a degree of concentration equal to or higher than a predetermined degree," the automatic return possibility determination unit 6 calculates the degree of concentration, which is an evaluation value indicating how much the driver is concentrating on the driving, from the appearance of the driver captured by the onboard camera 11. The calculation of the degree of concentration is performed on the assumption that the driver's eyelids are not closed (eyes are open). In this case, the automatic return possibility determination unit 6 determines whether or not the travel environment of the subject vehicle 20 satisfies the automatic return-possible condition based on whether or not the degree of concentration of the driver exceeds a predetermined threshold level. Here, the onboard camera 11 detects the movement of the driver's eyelids, and the less the driver blinks, the higher the automatic return possibility determination unit 6 calculates the degree of concentration of the driver. Additionally or alternatively, when the driver's line of sight is directed forward, the automatic return possibility determination unit 6 calculates the degree of concentration of the driver higher than that when the driver's line of sight is not directed forward. Additionally or alternatively, since people tend to open their pupils when they are in a tense state, the larger the pupil diameter of the driver's eyes captured by the onboard camera 11, the higher the automatic return possibility determination unit 6 calculates the degree of concentration of the driver.

When the travel environment of the subject vehicle 20 satisfies the automatic return-possible condition, the automatic return possibility determination unit 6 puts the driving mode control unit 1 into the automatic return standby state so that the driving mode can be automatically switched and returned from the second driving mode to the first driving mode. On the other hand, when determining that the travel environment of the subject vehicle 20 does not satisfy the automatic return-possible condition, the automatic return possibility determination unit 6 puts the driving mode control unit 1 into a state in which the driving mode cannot be automatically switched from the second driving mode to the first driving mode.

Additionally or alternatively, when the travel environment of the subject vehicle 20 satisfies the automatic return-possible condition, the automatic return possibility determination unit 6 may calculate a sufficiency level for the automatic return-possible condition based on the travel environment of the subject vehicle 20. For example, the automatic return possibility determination unit 6 may rank the accuracy of the map information for the travel route of the subject vehicle 20 and calculate the sufficiency level for the automatic return-possible condition. Additionally or alternatively, the automatic return possibility determination unit 6 may rank the degree of concentration of the driver of the subject vehicle 20 and calculate the sufficiency level for the automatic return-possible condition.

The determination result made by the automatic return possibility determination unit 6 is updated as needed until the timing when the driving mode automatically switches from the second driving mode to the first driving mode. Therefore, for example, the determination result that the travel environment of the subject vehicle 20 satisfies the automatic return-possible condition may change, before the driving mode switches from the second driving mode to the first driving mode, to a determination result that the travel environment of the subject vehicle 20 does not satisfy the automatic return-possible condition. Conversely, the determination result that the travel environment of the subject vehicle 20 does not satisfy the automatic return-possible condition may change to a determination result that the travel environment of the subject vehicle 20 satisfies the automatic return-possible condition.

The output unit 3 outputs information indicating the determination result of the automatic return possibility determination unit 6 to the user interface 16. That is, when the travel environment of the subject vehicle 20 satisfies the automatic return-possible condition after the driving mode switches from the first driving mode to the second driving mode, the output unit 3 outputs, to the user interface 16, first information indicating that the driving mode can be switched automatically from the second driving mode to the first driving mode. At this time, the first information which the output unit 3 outputs to the user interface 16 may include the sufficiency level for the automatic return-possible condition in the travel environment of the subject vehicle 20.

On the other hand, when the travel environment of the subject vehicle 20 does not satisfy the automatic return-possible condition after the driving mode switches from the first driving mode to the second driving mode, the output unit 3 outputs, to the user interface 16, second information indicating that the driving mode does not switch automatically from the second driving mode to the first driving mode.

When the user interface 16 is a display, the user interface 16 displays the first information and the second information with characters and/or images. Additionally or alternatively, when the user interface 16 is a display, the user interface 16 displays the first information and the second information by using characters and/or images. Additionally or alternatively, when the user interface 16 is a lamp, for example, the user interface 16 may display the first information by turning on the lamp and display the second information by turning off the lamp. Additionally or alternatively, the first information and the second information may be displayed in accordance with the difference in the color of light of the lamp when it is lit.

When presenting the first information including the sufficiency level for the automatic return-possible condition in the travel environment of the subject vehicle 20, the user interface 16 presents the sufficiency level for the automatic return-possible condition, for example, in percent (%) display. Additionally or alternatively, the user interface 16 may present the sufficiency level for the automatic return-possible condition by classifying it, for example, into five levels. Additionally or alternatively, when the user interface 16 is a lamp, the sufficiency level for the automatic return-possible condition may be displayed in a different form in the brightness or color of the light depending on each level.

The procedure of the driving control method using the driving control device 100 will now be described with reference to FIG. 2.

First, in step S1, the driving control device 100 switches the driving mode from the first driving mode to the second driving mode. Then, in step S2, the driving control device 100 determines whether or not the switching of the driving mode in step S1 is due to the driver's intervention operation. When a determination is made in step S2 that the switching from the first driving mode to the second driving mode is due to the driver's intervention operation, the control is concluded.

When a determination is made in step S2 that the switching from the first driving mode to the second driving mode is not due to the driver's intervention operation, that is, when a determination is made that the driving control device 100 automatically switches the driving mode from the first driving mode to the second driving mode, the control proceeds to step S3. In step S3, the automatic return possibility determination unit 6 of the driving control device 100 determines whether or not the travel environment of the subject vehicle 20 satisfies the automatic return-possible condition.

In step S3, when the automatic return possibility determination unit 6 of the driving control device 100 determines that the travel environment of the subject vehicle 20 does not satisfy the automatic return-possible condition, the control proceeds to step S8. In step S8, the output unit 3 outputs, to the user interface 16, the second information indicating that the driving mode of the subject vehicle 20 does not automatically switch from the second driving mode to the first driving mode.

On the other hand, in step S3, when the automatic return possibility determination unit 6 of the driving control device 100 determines that the travel environment of the subject vehicle 20 satisfies the automatic return-possible condition, the control proceeds to step S4. In step S4, the automatic return possibility determination unit 6 calculates the sufficiency level for the automatic return-possible conditions in the travel environment of the subject vehicle 20.

Then, the control proceeds to step S5. In step S5, the output unit 3 outputs, to the user interface 16, the first information indicating that the driving mode of the subject vehicle 20 can be automatically switched from the second driving mode to the first driving mode. The first information includes the sufficiency level for the automatic return-possible condition calculated in step S4.

Then, the control proceeds to step S6. In step S6, the driving mode control unit 1 of the driving control device 100 determines whether or not the driving situation of the subject vehicle 20 satisfies the driving mode return condition. When the driving situation of the subject vehicle 20 does not satisfy the driving mode return condition, the control is concluded. On the other hand, when a determination is made in step S6 that the driving situation of the subject vehicle 20 satisfies the driving mode return condition, the control proceeds to step S7.

Here, in step S5, the output unit 3 outputs the first information to the user interface 16 before the timing at which a determination is made in step S6 that the driving situation of the subject vehicle satisfies the driving mode return condition.

Then, in step S7, the driving mode control unit 1 of the driving control device 100 switches and returns the driving mode from the second driving mode to the first driving mode.

Figure 2:
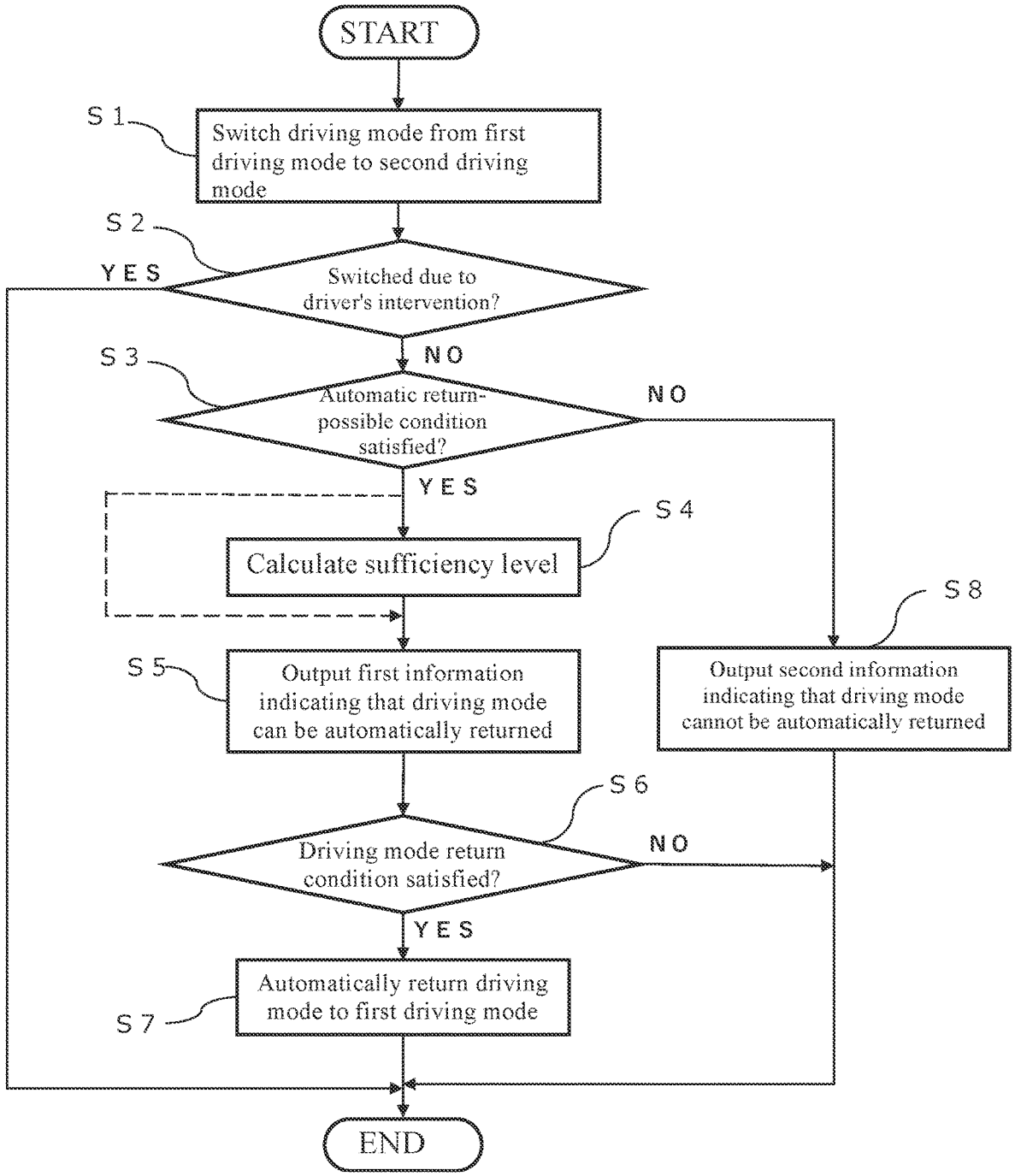
FIG. 2 is a flow chart illustrating the procedure of a driving control method executed by the driving control device illustrated in FIG. 1.

In the flowchart illustrated in FIG. 2, step S4 may be skipped. That is, the first information which the output unit 3 outputs may be information indicating only that the driving mode can be automatically switched and returned from the second driving mode to the first driving mode, rather than including the sufficiency level for the automatic return-possible condition.

When the travel environment of the subject vehicle 20 does not satisfy the automatic return-possible condition, the driving control device 100 outputs the second information in step S8, but the present embodiment is not limited to this, and the control may be concluded without outputting the first or second information.

As described above, after the driving mode switches from the first driving mode to the second driving mode, the driving control device 100 according to the present embodiment determines whether or not the travel environment of the subject vehicle 20 satisfies the automatic return-possible condition that is preliminarily defined. Then, when the travel environment of the subject vehicle satisfies the automatic return-possible condition after the driving mode switches from the first driving mode to the second driving mode, the driving control device 100 outputs, to the user interface 16, the first information indicating that the driving mode of the subject vehicle can be switched automatically from the second driving mode to the first driving mode. This allows the occupants of the subject vehicle 20 to confirm whether or not the driving mode can be automatically switched and returned from the second driving mode to the first driving mode after the driving mode switches from the first driving mode to the second driving mode. More specifically, when the user interface 16 presents the first information, the driver of the subject vehicle 20 can perceive that the driving mode can be automatically switched and returned from the second driving mode to the first driving mode. On the other hand, when the user interface 16 does not present the first information, the driving mode does not automatically switch from the second driving mode to the first driving mode, and the driver of the subject vehicle 20 can therefore perceive that manual operation is necessary to return the driving mode.

Additionally or alternatively, when the travel environment of the subject vehicle 20 does not satisfy the automatic return-possible condition after the driving mode switches from the first driving mode to the second driving mode, the output unit 3 of the driving control device 100 outputs, to the user interface 16, the second information indicating that the driving mode of the subject vehicle 20 does not switch automatically from the second driving mode to the first driving mode. This allows the driver of the subject vehicle 20 to perceive that manual operation is necessary to return the driving mode because when the user interface 16 presents the second information, the driving mode does not switch automatically from the second driving mode to the first driving mode.

Additionally or alternatively, the output unit 3 of the driving control device 100 outputs the first information including the sufficiency level for the automatic return-possible condition to the user interface 16. The higher the sufficiency level for the automatic return-possible condition, the higher the possibility that the travel environment of the subject vehicle 20 will continue a state of satisfying the automatic return-possible condition, and the occupants of the subject vehicle 20 can therefore perceive how high the probability that the driving mode automatically switches and returns from the second driving mode to the first driving mode is.

Additionally or alternatively, when the automatic return-possible condition is set as a condition regarding the travel route of the subject vehicle 20, the driving control device 100 can present the occupants of the subject vehicle 20 with whether or not the driving mode can automatically switch and return from the second driving mode to the first driving mode in accordance with the state of the route on which the subject vehicle is traveling or is expected to travel. For example, when the map database 14 has high-precision map information regarding the travel route of the subject vehicle 20, the driving control device 100 can control the subject vehicle 20 in a state of perceiving the road situation, lanes, traffic signs, etc. of the travel route of the subject vehicle 20 and can therefore return the driving mode with a raised driving assistance level. When the lane compartment lines and lane marks of the travel route of the subject vehicle 20 are clearly painted on the road surface and can be recognized with a predetermined accuracy or higher, the driving control device 100 can control the subject vehicle 20 based on the lane compartment lines and lane marks and can therefore return the driving mode with a raised driving assistance level. Additionally or alternatively, when congestion is occurring on the travel route of the subject vehicle 20, there are many scenes in which the subject vehicle 20 can follow a preceding vehicle, and it is therefore possible to return the driving mode with a raised driving assistance level.

Additionally or alternatively, when the automatic return-possible condition is set to relate to the situation of the driver of the subject vehicle 20, the driving control device 100 can present the occupants of the subject vehicle 20 with whether or not the driving mode can automatically switch and return from the second driving mode to the first driving mode in accordance with the situation such as the degree of concentration of the driver. For example, the driving control device 100 can execute the switching of the driving mode in a state in which the driver is concentrating on the driving.

Additionally or alternatively, when the driving situation of the subject vehicle 20 satisfies the driving mode return condition in a state in which the travel environment of the subject vehicle 20 satisfies the automatic return-possible condition, the driving control device 100 outputs the first information to the user interface 16 before the timing at which the driving situation of the subject vehicle 20 satisfies the driving mode return condition. Through this operation, the driving control device 100 can preliminarily present the occupants with the possibility of return of the driving mode before it is determined that the driving mode will automatically switch and return from the second driving mode to the first driving mode. Thus, the driving control device 100 outputs the first information to thereby allow the driver of the subject vehicle 20 to perceive the possibility that the driving mode will switch and return from the second driving mode to the first driving mode, and the driver can perform the driving operation so that the driving situation of the subject vehicle 20 satisfies the driving mode return condition.

Additionally or alternatively, when the driving mode switches from the first driving mode to the second driving mode due to the driver's intervention operation, the driving control device 100 does not output the first information to the user interface 16 regardless of whether or not the travel environment of the subject vehicle satisfies the automatic return-possible condition. That is, when the driving mode is switched from the first driving mode to the second driving mode by the intention of the driver, the driver usually does not want the driving mode to automatically switch and return from the second driving mode to the first driving mode, so the driving mode is not automatically returned.

In the present embodiment, when the driving mode switches from the first driving mode to the second driving mode due to the intervention operation of the driver, the output unit 3 outputs none of the first information and the second information to the user interface 16, but the present embodiment is not limited to this, and only the second information may be output.

Second Embodiment

Figure 3:
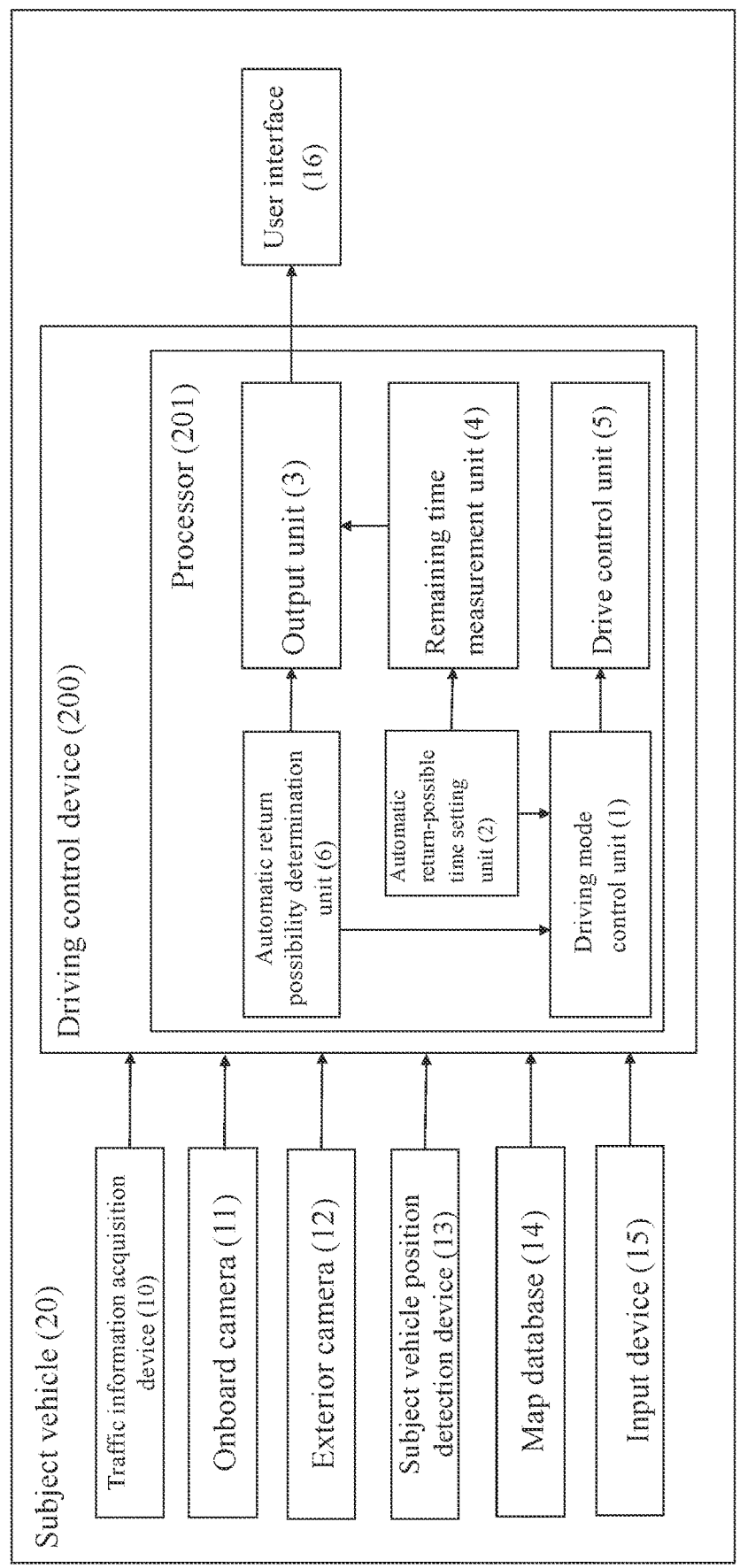
FIG. 3 is a block diagram illustrating the configuration of a driving control device according to a second embodiment of the present invention.
Figure 4:
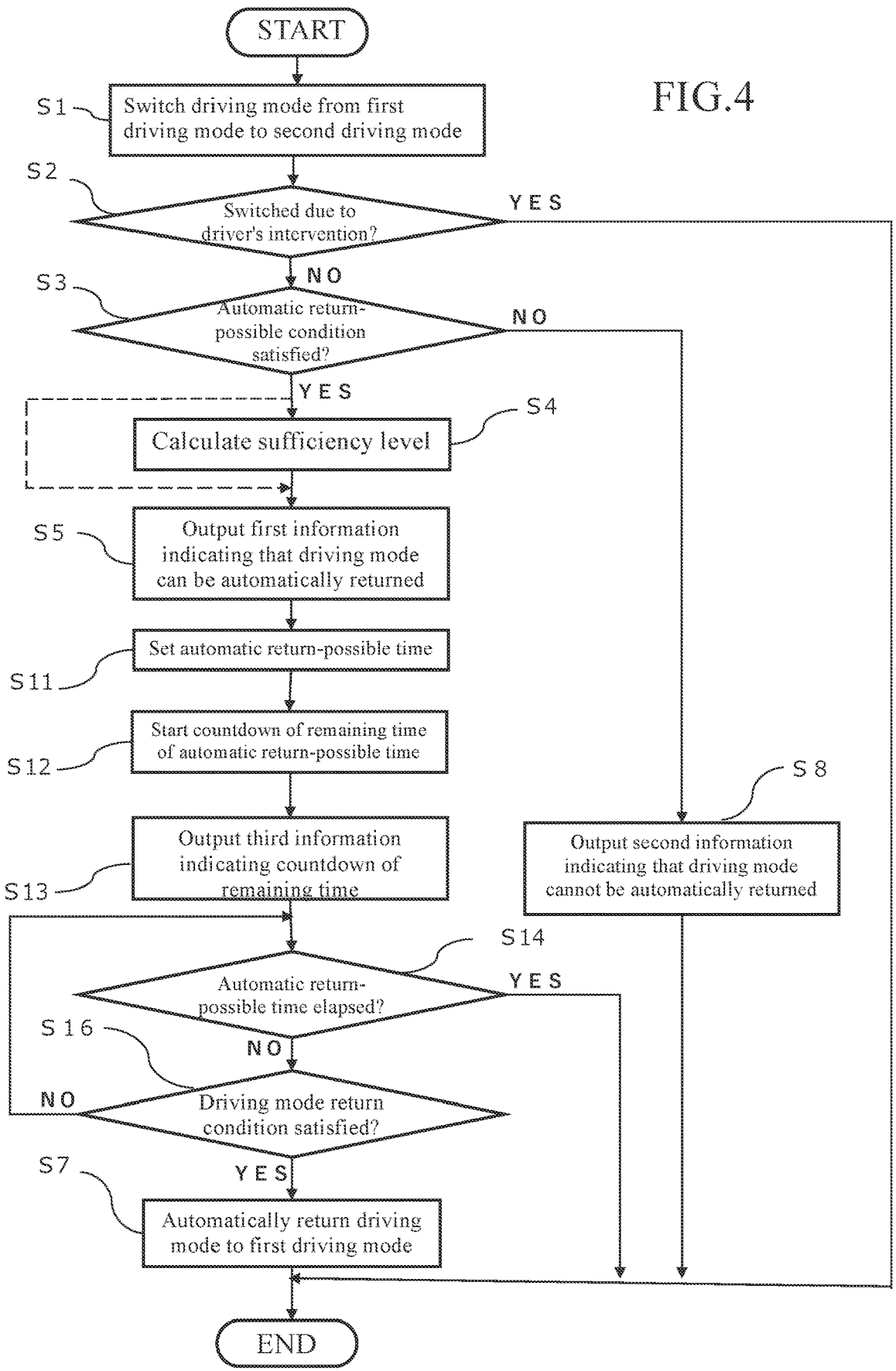
FIG. 4 is a flow chart illustrating the procedure of a driving control method executed by the driving control device illustrated in FIG. 3.

The second embodiment will be described with reference to FIGS. 3 and 4. In FIG. 3, the same reference numerals as those illustrated in FIG. 1 denote the same or similar configurations, so the detailed description will be omitted. Also in FIG. 4, the same reference numerals as those illustrated in FIG. 2 denote the same or similar processing, so the detailed description will be omitted.

FIG. 3 is a block diagram illustrating the configurations of a driving control device 200 and a subject vehicle 20 according to the present embodiment.

A processor 201 of the driving control device 200 executes the functions of the driving control device 200. The processor 201 of the driving control device 200 has an automatic return-possible time setting unit 2 and a remaining time measurement unit 4 in addition to the configuration of the processor 101 of the driving control device 100 according to the first embodiment.

The automatic return-possible time setting unit 2 of the driving control device 200 determines an automatic return-possible time starting from the timing at which the driving mode of the subject vehicle 20 switches from the first driving mode to the second driving mode. The automatic return-possible time is a time in which the driving mode can automatically switch from the second driving mode to the first driving mode. The automatic return-possible time setting unit 2 sets the automatic return-possible time in accordance with the driving situation of the subject vehicle 20. Specifically, the automatic return-possible time which the automatic return-possible time setting unit 2 sets is different between when the driving mode control unit 1 switches the first driving mode and the second driving mode based on the vehicle speed of a preceding vehicle and when the driving mode control unit 1 switches the first driving mode and the second driving mode based on the lane change operation of the subject vehicle 20. The automatic return-possible time corresponding to the driving situation of the subject vehicle 20 is preliminarily determined by experiments, but it may be changed in accordance with the vehicle speed or the like of the subject vehicle 20.

At the timing when the driving mode switches from the first driving mode to the second driving mode, the remaining time measurement unit 4 of the driving control device 200 starts a countdown of the remaining time from the current time until the automatic return-possible time elapses. Specifically, when the automatic return-possible time is set to 30 seconds, the remaining time measuring unit 4 executes the countdown from 30 seconds to 0 seconds of the remaining time starting from the timing at which the driving mode of the subject vehicle 20 switches from the first driving mode to the second driving mode.

The output unit 3 of the driving control device 200 outputs, to the user interface 16, third information indicating the remaining time, which is counted down by the remaining time measuring unit 4, in addition to the first information or the second information. When the user interface 16 is a display, the user interface 16 presents the occupants of the subject vehicle 20 with an image that numerically represents the remaining time to be counted down. Additionally or alternatively, the user interface 16 may present the occupants with an image of a bar whose length gradually decreases in accordance with the length of the remaining time. Additionally or alternatively, when the user interface 16 is a speaker, the remaining time may be counted down by voice.

The procedure of a driving control method using the driving control device 200 will be described with reference to FIG. 4.

The driving control device 200 executes step S11 following step S5 of outputting the first information indicating that the driving mode can be automatically switched from the second driving mode to the first driving mode. In step S11, the automatic return-possible time setting unit 2 of the driving control device 200 sets the automatic return-possible time starting from the timing when the driving mode of the subject vehicle 20 switches from the first driving mode to the second driving mode.

Then, the control proceeds to step S12. In step S12, the remaining time measurement unit 4 of the driving control device 200 starts the countdown of the remaining time from the timing when the driving mode switches from the first driving mode to the second driving mode to the timing when the automatic return-possible time elapses.

Subsequently, the control proceeds to step S13. In step S13, the output unit 3 of the driving control device 200 starts outputting the third information indicating the countdown of the remaining time of the automatic return-possible time. The user interface 16 thereby presents the countdown of the remaining time to the occupants.

The processing of steps S2 to S5 and the processing of steps S11 to S13 may be executed in parallel at approximately the same timing. The third information may be output simultaneously with the first information or may also be output after the first information. The user interface 16 which outputs the first information and the user interface 16 which outputs the third information may be the same device or different devices.

Then, the control proceeds to step S14. In step S14, the driving control device 200 determines whether or not the automatic return-possible time elapses after the driving mode switches from the first driving mode to the second driving mode.

When the automatic return-possible time does not elapse yet, the control proceeds to step S16. In step S16, the driving control device 200 determines whether or not the driving situation of the subject vehicle 20 satisfies the driving mode return condition. When the driving situation of the subject vehicle 20 does not satisfy the driving mode return condition, the control returns to before step S14. When the driving situation of the subject vehicle 20 satisfies the driving mode return condition before the automatic return-possible time elapses, the control proceeds to step S7, in which the driving control device 200 automatically switches and returns the driving mode from the second driving mode to the first driving mode.

On the other hand, when a determination is made in step S14 that the automatic return-possible time elapses, the control is concluded. That is, after the automatic return-possible time elapses, the driving control device 200 switches and returns the driving mode from the second driving mode to the first driving mode only when the driver's driving mode switching request is input to the input device 15.

As described above, when, in the state in which the travel environment of the subject vehicle 20 satisfies the automatic return-possible condition, the driving situation of the subject vehicle 20 satisfies the driving mode return condition before the automatic return-possible time elapses, the driving control device 200 according to the present embodiment executes the countdown of the remaining time from the current time until the automatic return-possible time elapses. Then, the driving control device 200 outputs the third information indicating the countdown of the remaining time of the automatic return-possible time to the user interface of the subject vehicle 20. Through this operation, the occupants including the driver of the subject vehicle 20 can perceive the remaining time of the automatic return-possible time during which the driving mode can return from the second driving mode to the first driving mode. In addition, when the remaining time of the automatic return-possible time becomes 0, an occupant confirms that the driving mode will not automatically return to the first driving mode after that, and if the occupant wishes to return the driving mode, he/she can input a driving mode return instruction (driving mode switching request) to the input device 15.

DESCRIPTION OF REFERENCE NUMERALS 100, 200 . . . Driving control device
101, 201 . . . Processor
3 . . . Output unit
6 . . . Automatic return possibility determination unit
16 . . . User interface
20 . . . Subject vehicle

The invention claimed is:

1. A driving control method using a processor that controls driving of a subject vehicle using any one of at least two driving modes including a first driving mode and a second driving mode, the second driving mode having a lower driving assistance level than that of the first driving mode, wherein the processor is configured to:

after a driving mode switches from the first driving mode to the second driving mode, determine whether or not a travel environment of the subject vehicle satisfies an automatic return-possible condition that is a condition for the driving mode to automatically return from the second driving mode to the first driving mode;

when the travel environment of the subject vehicle satisfies the automatic return-possible condition after the driving mode switches from the first driving mode to the second driving mode, output, to a user interface, a first indicator indicating that the driving mode of the subject vehicle can be switched automatically from the second driving mode to the first driving mode;

in a state in which the travel environment of the subject vehicle satisfies the automatic return-possible condition after the driving mode switches from the first driving mode to the second driving mode, determine whether or not a driving situation of the subject vehicle satisfies a driving mode return condition that is preliminarily defined; and when in the state in which the travel environment of the subject vehicle satisfies the automatic return-possible condition after the driving mode switches from the first driving mode to the second driving mode, the driving situation of the subject vehicle satisfies the driving mode return condition that is preliminarily defined,
output the first indicator to the user interface before a timing at which the driving situation of the subject vehicle satisfies the driving mode return condition as output the first indicator to the user interface at a timing at which the travel environment of the subject vehicle satisfies the automatic return-possible condition, and
automatically return the driving mode from the second driving mode to the first driving mode by the driving situation of the subject vehicle satisfying a predetermined driving mode return condition after the travel environment of the subject vehicle satisfies the automatic return-possible condition.

2. The driving control method according to claim 1, wherein the processor is configured to:
when the travel environment of the subject vehicle does not satisfy the automatic return-possible condition after the driving mode switches from the first driving mode to the second driving mode, output, to the user interface, a second indicator indicating that the driving mode of the subject vehicle does not switch automatically from the second driving mode to the first driving mode.

3. The driving control method according to claim 1, wherein the processor is configured to:
when the travel environment of the subject vehicle satisfies the automatic return-possible condition after the driving mode switches from the first driving mode to the second driving mode, calculate a sufficiency level for the automatic return-possible condition based on the travel environment; and
output, to the user interface, the first indicator including the sufficiency level for the automatic return-possible condition.

4. The driving control method according to claim 1, wherein the automatic return-possible condition is a condition regarding a travel route of the subject vehicle.

5. The driving control method according to claim 1, wherein the automatic return-possible condition is a condition regarding a situation of a driver of the subject vehicle.

6. The driving control method according to claim 1, wherein the processor is configured to:
set an automatic return-possible time starting from a timing at which the driving mode of the subject vehicle switches from the first driving mode to the second driving mode, the automatic return-possible time being a time in which the driving mode can automatically switch from the second driving mode to the first driving mode;
in the state in which the travel environment of the subject vehicle satisfies the automatic return-possible condition after the driving mode switches from the first driving mode to the second driving mode, determine whether or not the driving situation of the subject vehicle satisfies the driving mode return condition before the automatic return-possible time elapses; and
when in the state in which the travel environment of the subject vehicle satisfies the automatic return-possible condition after the driving mode switches from the first driving mode to the second driving mode, the driving situation of the subject vehicle satisfies the driving mode return condition before the automatic return-possible time elapses,
execute a countdown of a remaining time from a current time until the automatic return-possible time elapses, and
output a third indicator indicating the countdown of the remaining time to the user interface of the subject vehicle.

7. The driving control method according to claim 1, wherein the processor is configured not to output the first indicator to the user interface when the driving mode switches from the first driving mode to the second driving mode due to an intervention operation of a driver of the subject vehicle.

8. A driving control device having a processor that controls driving of a subject vehicle using any one of at least two driving modes including a first driving mode and a second driving mode, the second driving mode having a lower driving assistance level than that of the first driving mode, the processor comprising:
an automatic return possibility determination unit configured to, after a driving mode switches from the first driving mode to the second driving mode, determine whether or not a travel environment of the subject vehicle satisfies an automatic return-possible condition that is a condition for the driving mode to automatically return from the second driving mode to the first driving mode;
an output unit configured to, when the travel environment of the subject vehicle satisfies the automatic return-possible condition after the driving mode switches from the first driving mode to the second driving mode, output, to a user interface, a first indicator indicating that the driving mode of the subject vehicle can be switched automatically from the second driving mode to the first driving mode;
in a state in which the travel environment of the subject vehicle satisfies the automatic return-possible condition after the driving mode switches from the first driving mode to the second driving mode, the processor determines whether or not a driving situation of the subject vehicle satisfies a driving mode return condition that is preliminarily defined; and
when in the state in which the travel environment of the subject vehicle satisfies the automatic return-possible condition after the driving mode switches from the first driving mode to the second driving mode, the driving situation of the subject vehicle satisfies the driving mode return condition that is preliminarily defined,
the output unit outputs the first indicator to the user interface before a timing at which the driving situation of the subject vehicle satisfies the driving mode return condition as output the first indicator to the user interface at a timing at which the travel environment of the subject vehicle satisfies the automatic return-possible condition, and
a driving mode control unit configured to automatically return the driving mode from the second driving mode to the first driving mode by a driving situation of the subject vehicle satisfying a predetermined driving mode return condition after the travel environment of the subject vehicle satisfies the automatic return-possible condition.

* * * * *